June 17, 1958  W. MORETTI ET AL  2,839,098
CUT-LINE INDICATOR FOR PORTABLE CIRCULAR SAW
Filed Dec. 28, 1956  2 Sheets-Sheet 1

*INVENTORS*
WHITFIELD MORETTI
ROBERT CRANMORE
BY *Chapin & Neal*
ATTORNEYS

June 17, 1958  W. MORETTI ET AL  2,839,098
CUT-LINE INDICATOR FOR PORTABLE CIRCULAR SAW
Filed Dec. 28, 1956  2 Sheets-Sheet 2

INVENTORS
WHITFIELD MORETTI
ROBERT CRANMORE
BY Chapin & Neal
ATTORNEYS

નoઇ

2,839,098
CUT-LINE INDICATOR FOR PORTABLE CIRCULAR SAW

Whitfield Moretti, Millers Falls, and Robert Cranmore, Shelburne Falls, Mass., assignors to Millers Falls Company, Greenfield, Mass., a corporation of Massachusetts Application December 28, 1956, Serial No. 631,282

5 Claims. (Cl. 143—43)

This invention relates to power operated hand saws of the type having mechanism for adjusting the angle of the blade relative to a working contacting plate in order to make bevel cuts. More particularly the invention relates to a cut-line indicator device which will automatically compensate for any change in the angular relation between blade and work contacting plate when the saw unit is adjusted for a particular cut.

An object of the invention is to provide in a saw unit of the above type in which a change in the angle of the blade results in a lateral shifting of the line of planar intersection between blade and work contacting plate, mechanism for correspondingly shifting a cut-line indicator guide in a plane parallel to the plane of the work contacting plate. Thus the operator need employ no guesswork in following a guide line on the surface of the work dependent on the angle of the cut being made in the workpiece.

Another object is to provide an indicator mechanism in which a usual type of rip guide device may be carried and which will automatically hold true the particular setting of the rip guide during any changes in the angular positioning of the saw blade.

A further object is to provide an indicator device in which a rip guide element may be readily positioned regardless of the angle of cut to be made by the saw.

These and other specific objects and advantages of the invention will be apparent from the following description of an embodiment of the same as shown in the accompanying drawings in which, Fig. 1 is a side elevational view with parts in section of an electric hand saw embodying the invention;

Figure 1:
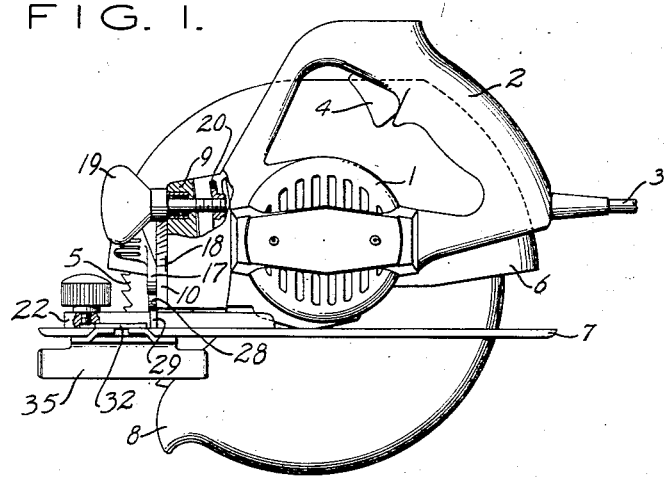
Figure 2:
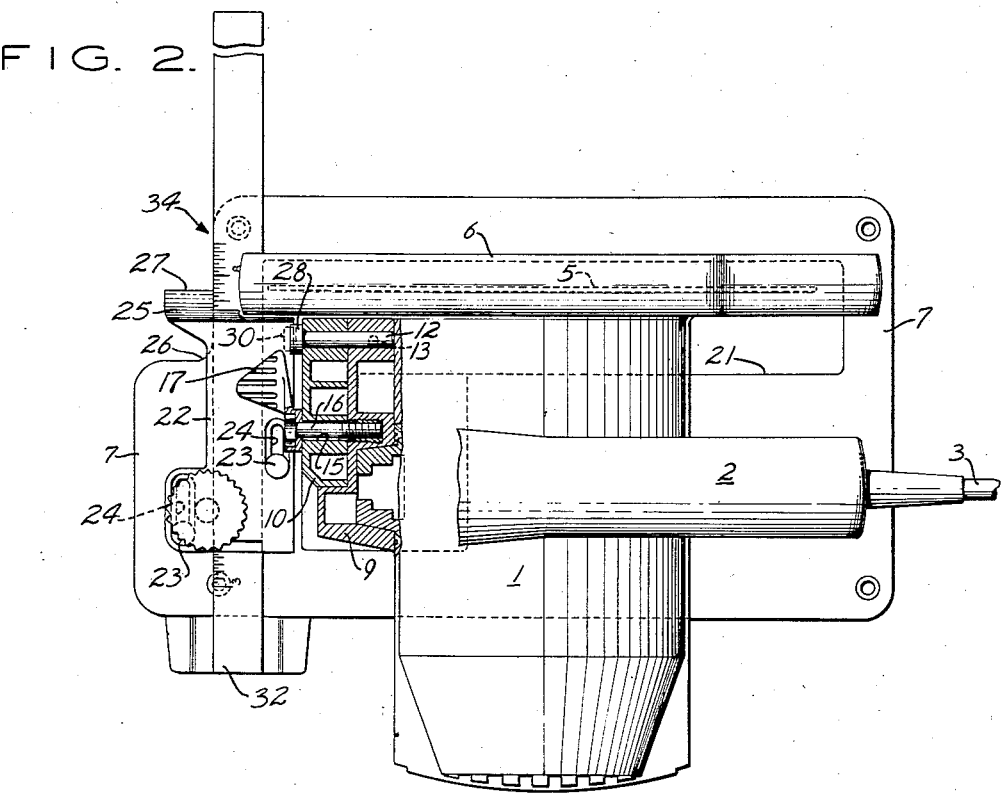
Fig. 2 is a top plan view on an enlarged scale of the unit of Fig. 1 with parts in section.

Electric saw units of the type shown by Figs. 1 and 2 are commonly provided with means for changing the angularity of the cutting blade with respect to the work contacting plate or shoe which in normal use rests on the surface of a workpiece while making a cut. Thus a straight or bevel cut can be made. Most commonly, however, a change in the angular relationship of blade is accompanied by a shifting of the line of intersection between blade and work shoe since the axis of pivotal relation between the two is generally offset from the plane of the blade. If a cut-line indicator marking is provided on the shoe for the user to "sight" a path along which the cut is desired, the chance for error is obvious when a bevel cut adjustment is made. At the very least the user needs to keep in mind the amount of variation necessary for a true cut or to accurately "pick out" his correct sighting line from a plurality of closely adjacent markings.

The device of the present invention provides a single, automatically compensating, accurate line indicator. The operator simply registers the edges of the indicator with a guide line on the work and may then easily follow the same. Where a rip guide device is used the new mechanism provides means for quickly and accurately setting up the rip guide whatever the angular positioning of the saw blade and work plate may be.

The invention resides in the construction and relationship of the various parts in which a slide member is mounted for reciprocation on the work-contacting plate and is movable in response to the direction of pivotal movement between the work plate and frame on which the saw motor and blade are carried.

In the drawings Fig. 1 shows a motor frame at 1, a handle at 2, an electric conduit line to the handle at 3 and a current switch at 4. Driven by the motor (not shown) is a circular saw blade 5 over the upper portion of which is a usual frame mounted stationary cover 6. The blade extends below a work contacting or shoe plate 7 pivotally related to the frame as will be described and below the shoe the lower portion of the blade is encased by a swing guard 8 for covering the same when the saw is not in use. The guard 8 swings back to expose the blade in the usual manner when the saw is advanced into a workpiece will be readily understood in the art.

Forwardly of the handle 2 is mounted a depth segment 9 anchored to the frame in suitable fashion and in the outer face of segment 9 is received a slotted bevel segment 10. The segment 10 is received in a recess 11 (Fig. 4) of the segment 9 and pivoted thereto as on a pivot pin member 12. The pin 12 is fixed in segment 9 as by a set screw at 13 (Fig. 2) and the bevel segment 10 is rotatably carried on the pin.

Figure 3:
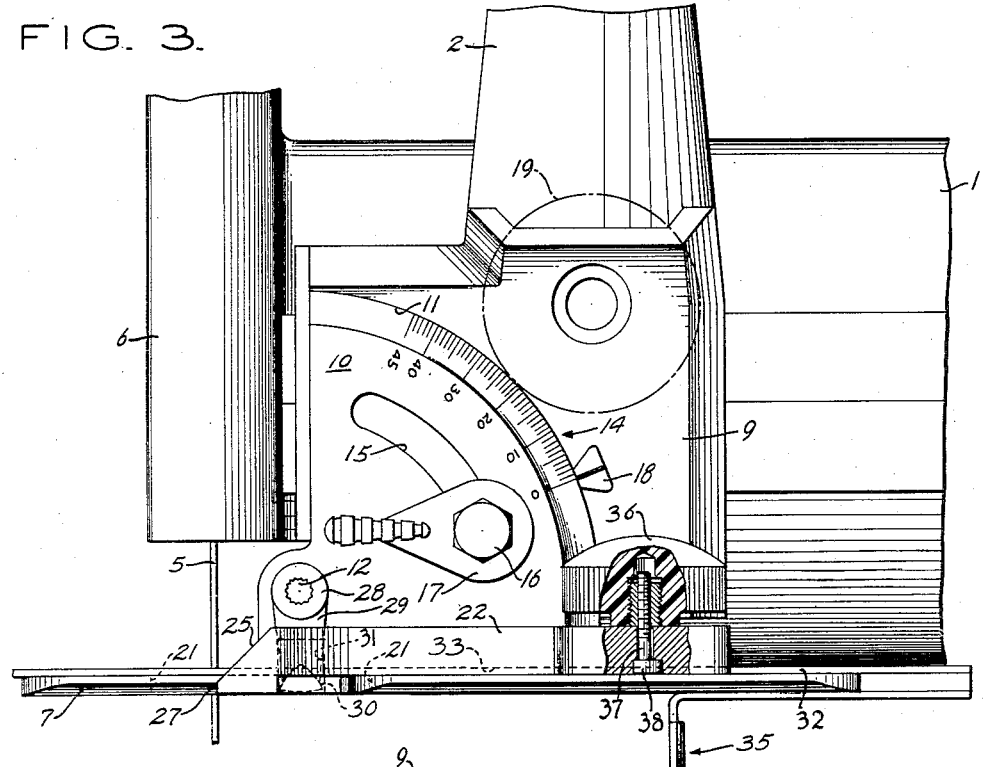
Fig. 3 is a view from the front of the unit of Figs. 1 and 2 on a still larger scale with parts cut away and showing the device with the parts positioned for a cut at 90° to a work surface.

As best shown by Fig. 3 the slotted bevel segment is marked with indicia at 14 as for a 45° or less adjustment from a straight or 90° cut in a workpiece. The segment 10 is suitably affixed at its base rigidly to the shoe plate 7 and tilts the latter as the segment 10 is swung on the pivot 12. The slot at 15 of segment 10 engages a post 16 threaded into the segment 9 (Fig. 2) and a locking lever 17 is carried on the outer end of the post for turning and clamping against the surface of segment 9 to hold the same in any position to which it may be swung relative to the frame. An indexing reference mark is shown at 18 on the depth segment 9 for registering the degree of bevel cut desired. Segment 9 also carries a knob or hand hold 19 for anchoring the segment as by a nut at 20 (Fig. 1) to the handle and frame structure.

Figure 4:
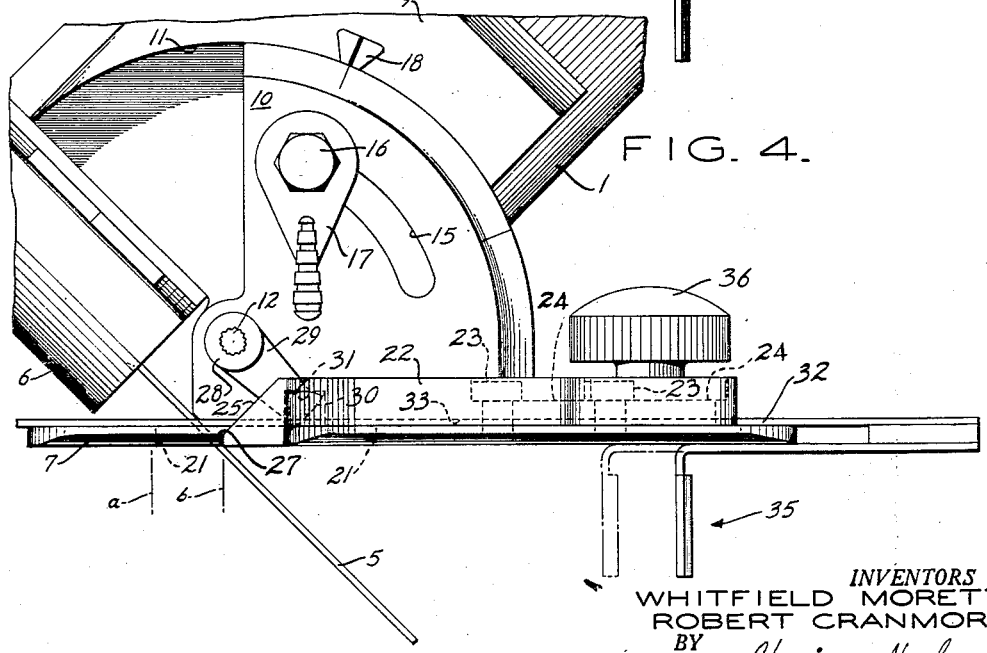
Fig. 4 is a view similar to Fig. 3 with the saw blade adjusted to make a 45° bevel cut in the work.

It will be seen from the description of the assembly as thus far set forth that the relative pivotal movement of the frame 1 and shoe plate 7 is on a pivotal axis upwardly offset from the plane of the shoe plate and laterally of the blade 5, and that as a result the tilting of the plate 7 will cause the line of intersection of the plane of the saw with the plane of the plate to be shifted. The lower edge of the saw will also be carried to a lower point with respect to the work engaging undersurface of the plate since the axis of the saw will be swung around the axis of the pin 12 from a point above the same. These factors will be appreciated from an inspection of the relative positions of Figs. 3 and 4. In Fig. 4 the extent of the lateral shifting of the point of intersection from a 90° cut to that of a 45° cut is indicated by the dot-dash lines $a$ and $b$. The extent to which the blade is lowered with respect to the plate is not indicated but will be readily apparent from the relative positioning of the lower edge of the guard 6 in Figs. 3 and 4.

As best shown by Fig. 2 the plate 7 is conventionally slotted as indicated at 21 for projection of the blade 5 below the plate 7 and the lateral shift of the blade and swing guard (not shown in Fig. 2) for a bevel cut. As will be appreciated from Fig. 2 the advantages of a cut-line indicator for the operator to guide the cut along a desired line (as a line scribed on the workpiece surface) will be obvious. In the art it has been common to indicate at the leading edge of the shoe plate slot or plate edge a reference line indicator to follow a guide line on the work for the more commonly used 90° cut. This obviously will not serve accurately for a bevel cut and the user is obliged to resort to guesswork or time-consuming calculations to make a true cut. It is the purpose of the present invention to eliminate such guess-work and to provide an accurate automatically compensating single cut-line indicator in conjunction with a rip guide device as will now be specifically described.

In Fig. 2 there is shown a rip guide and indicator shoe plate as the slide 22 mounted for limited reciprocable movement transversely of shoe plate 7 adjacent the base of the segment 10. Such movement is permitted by headed pins 23 fixed to plate 7 and riding in a pair of elongated shouldered slots 24 of slide 22. At its forward end the slide is provided with a beveled portion at 25 overlapping a cut back at 26 of the shoe plate 7. The bevel provides the forward straight edge at 27 for a cut-line guide for the saw blade 5, the edge 27 lying in a plane at the inner edge of the blade. The position of parts for the 90° cut as shown by Fig. 2 is also seen in Fig. 3.

In Fig. 2 the pin 12, on which the bevel segment 10 is pivoted is shown as projecting beyond the face of the segment. On the outer end of the pin is fixed the inner collared end 28 of a cam guide or arm 29 rotatable with the pin. The lower end of the arm is formed with an outwardly directed cam projection 30 received in a notch 31 cut in the adjacent under edge portion of slide 22. The lobed upper surface of the cam projection 30 is suitably formed to engage the surfaces of the notch 31 in moving the slide between its extreme positions as shown by Figs. 3 and 4. It will be seen that in tilting the plate 7 relative to the frame the arm 29 is swung on the pin 12 to carry the slide 22 back and forth on the surface of plate 7. In moving, for example, from a 90° position (Fig. 3) to a 45° bevel position (Fig. 4) the blade 5 shifts its line of intersection inwardly of the plate and as it does the slide carries the edge 27 along with it to indicate the line of cut to be made by the blade at any position of angular adjustment.

As will also be noted the slide 22 is provided with a rip guide beam 32 mounted thereon for similar automatic shifting adjustment as the angle of the blade 5 is changed. The beam 32 is fitted in a longitudinal channel indicated at 33 and cut in the underside of the slide 22. On its upper surface the beam is suitably marked as at 34 (Fig. 2) to indicate correct measurements from the line indicator edge 27 to a conventional type of rip guide shoe indicated at 35 (Fig. 3). The rip guide shoe as will be readily appreciated in the art is for guiding the saw along the edge of a workpiece in making a cut.

The beam 32 is adjustably locked on the slide 22 as by means of a clamping knob 36 in which the upper end of a clamping screw 37 extends from a recess adjacent channel 33. In the recess an eccentric foot 38 of the screw is provided to turn against the edge of the beam and releasably bind the same in the position to which it may be adjusted.

What is claimed is:

1. An automatically compensating cut-line indicator device for a powered circular hand saw of the type having a motor frame, a work contacting plate, a saw blade intersecting the plane of the plate, and adjustable tilting mechanism between said frame and plate for angularly fixing said blade relative to the plate to effect a bevel cut; said device comprising a member reciprocably mounted on said work plate for movement in a direction transversely related to the plane of said saw blade and provided with an indicator sighting portion lying in contiguous relation to the plane of the blade and forwardly of the cutting edge thereof, and means rotatable with said frame on the pivotal axis of said tilting mechanism including camming means engaging said member outwardly of said pivotal axis for moving said reciprocable member in response to tilting movement between said frame and work plate.

2. An automatically compensating cut-line indicator and rip guide device for a powered circular hand saw assembly having a motor frame, a work contacting plate, a saw blade extending below the plate and adjustable connecting means for angularly tilting said frame and blade relative to the plate to effect a bevel cut, said device comprising a shoe plate slidable on said work contacting plate transversely of the plane of said blade, said shoe plate having means for adjustably clamping a longitudinally slidable rip guide beam thereto, a pivot pin member on the axis of relative tilting movement between said work contacting plate and frame being fixed for rotation with said frame, an arm radially extending from said pin member and means on said slidable shoe engaging the outer end of said arm for transferring the pivotal motion of said arm to linear motion of said shoe relative to said work contacting plate.

3. In a powered circular hand saw of the type having a motor frame, a work contacting plate, a saw blade intersecting the plane of the plate, and adjustable tilting mechanism between said frame and plate for angularly fixing said blade relative to the plate to effect a bevel cut, an automatically compensating cut-line indicator device comprising a pivot member on the axis of said tilting mechanism rotatable with the frame during said relative tilting movement, said pivot member having an arm extending radially therefrom, and a slidable plate having a rip guide beam releasably clamped to said plate, said plate being carried by said work plate for reciprocating movement transversely of the plane of said blade and provided with a sighting edge registering with the plane of said saw blade, the outer end of said radial arm having a cam and slot connection with said plate for sliding movement of the latter responsive to movement of said pivot.

4. In a powered circular hand saw of the type having a motor frame, a work contacting plate, a saw blade intersecting the plane of the plate, and adjustable tilting mechanism between said frame and plate for angularly fixing said blade relative to the plate to effect a bevel cut, an automatically compensating cut-line indicator device comprising a pivot pin for said tilting mechanism rotatable with said frame during said relative tilting movement, an indicator slide mounted for limited reciprocatory movement on the surface of said work plate transversely of the plane of said saw blade and including a cut-line indicating edge in alignment with said plane of the saw blade, an arm extending radially from said rotatable pivot, and a cam connection at the outer end of said arm with said reciprocable slide for movement of said slide in response to the tilting of said frame and work plate.

5. In a powered circular hand saw of the type having a motor frame, a work contacting plate, a saw blade intersecting the plane of the plate and adjustable tilting mechanism between said frame and plate including a segment member carrying said plate at right angles thereto for angularly fixing said blade relative to the plate to effect a bevelled cut; an automatically compensating cut-line indicator device comprising a pivot pin anchored to said frame, extending through said segment member, and mounting the same for tilting movement between said frame and plate, said pin projecting from the outer face of the segment in spaced relation to said work plate, an indicator slide on the surface of said work plate in spaced relation to said pin projection and having slidable pin and slot connections with the plate and for reciprocating movement on the plate transversely of the plane of said saw blade, said slide having a forward cut-line indicating edge in alignment with the plane of the said blade forwardly of the blade, an arm fixed on said projecting pivot pin portion extending radially in the direction of said slide with the outer end of said arm formed with an outwardly directed projection and said reciprocable slide having a slotted recess in the under edge thereof registering with said projection and receiving the same, whereby pivotal movement of said arm will move said slide in response to the tilting of said frame and work plate and maintain said forward cut-line indicator edge in registration with the plane of the saw blade during the tilting thereof.

References Cited in the file of this patent
UNITED STATES PATENTS

| | | |
|---|---|---|
| 2,671,476 | Richards et al. | Mar. 9, 1954 |
| 2,800,933 | Michael | July 30, 1957 |